US010721194B2

(12) United States Patent
Kim et al.

(10) Patent No.: US 10,721,194 B2
(45) Date of Patent: Jul. 21, 2020

(54) USER TERMINAL DEVICE FOR RECOMMENDING RESPONSE TO A MULTIMEDIA MESSAGE BASED ON AGE OR GENDER, AND METHOD THEREFOR

(71) Applicant: Samsung Electronics Co., Ltd., Suwon-si, Gyeonggi-do (KR)

(72) Inventors: Yu-na Kim, Suwon-si (KR); Deok-ho Kim, Seoul (KR); Gyu-tae Park, Seoul (KR); Jun-bum Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/771,814

(22) PCT Filed: Aug. 9, 2016

(86) PCT No.: PCT/KR2016/008719
§ 371 (c)(1),
(2) Date: Apr. 27, 2018

(87) PCT Pub. No.: WO2017/082519
PCT Pub. Date: May 18, 2017

(65) Prior Publication Data
US 2018/0309706 A1 Oct. 25, 2018

(30) Foreign Application Priority Data
Nov. 10, 2015 (KR) .................. 10-2015-0157681

(51) Int. Cl.
*G06F 17/27* (2006.01)
*G10L 15/26* (2006.01)
(Continued)

(52) U.S. Cl.
CPC .............. *H04L 51/10* (2013.01); *G06F 3/023* (2013.01); *G10L 15/1815* (2013.01);
(Continued)

(58) Field of Classification Search
CPC .... G06F 17/279; G06F 16/243; G06F 17/276; G06Q 30/0631
(Continued)

(56) References Cited

U.S. PATENT DOCUMENTS 8,589,407 B2   11/2013   Bhatia
8,893,023 B2   11/2014   Perry et al.
(Continued)

FOREIGN PATENT DOCUMENTS

CN   102750311 A   10/2012
CN   103079008 A   5/2013
(Continued)

OTHER PUBLICATIONS

Extended European Search Report dated Sep. 21, 2018, issued in the European Application No. 16864445.8-1216/3352438.
(Continued)

*Primary Examiner* — Farzad Kazeminezhad
(74) *Attorney, Agent, or Firm* — Jefferson IP Law, LLP

(57) ABSTRACT

A user terminal device is provided. The user terminal device includes: a communicator; a display; and a processor configured to receive a message from another electronic device through the communicator, control the display to display the received message, and based on the received message being a multimedia message including at least one of an image, a sound, and a video by analyzing the received message, control the display to display a recommended response list based on at least one of an age or a gender of the user of the terminal corresponding to a type of content included in a multimedia message. Therefore, convenience of a user using the user terminal device is improved.

18 Claims, 21 Drawing Sheets

(51) Int. Cl.
*G06Q 30/06* (2012.01)
*H04L 12/58* (2006.01)
*H04M 1/725* (2006.01)
*G06F 3/023* (2006.01)
*G10L 15/18* (2013.01)
*H04L 29/08* (2006.01)

(52) U.S. Cl.
CPC .............. *H04L 51/02* (2013.01); *H04L 67/22* (2013.01); *H04M 1/72547* (2013.01); *H04M 1/72555* (2013.01); *H04M 1/72569* (2013.01); *G06F 3/0236* (2013.01); *H04M 2201/42* (2013.01)

(58) Field of Classification Search
USPC ...................................................... 704/9, 254
See application file for complete search history.

(56) References Cited

U.S. PATENT DOCUMENTS

| | | | |
|---|---|---|---|
| 8,972,323 | B2 | 3/2015 | Grieves et al. |
| 8,996,639 | B1 | 3/2015 | Faaborg et al. |
| 9,858,343 | B2 | 1/2018 | Heck et al. |
| 2007/0070979 | A1 | 3/2007 | Kim et al. |
| 2007/0130274 | A1 | 6/2007 | Lee et al. |
| 2010/0100568 | A1 | 4/2010 | Papin et al. |
| 2011/0105190 | A1* | 5/2011 | Cha ....................... G06F 17/276 455/566 |
| 2011/0258499 | A1 | 10/2011 | Casarsa |
| 2012/0233015 | A1* | 9/2012 | Calman .............. G06Q 30/0633 705/26.8 |
| 2012/0253788 | A1* | 10/2012 | Heck ..................... G06F 17/279 704/9 |
| 2012/0253790 | A1 | 10/2012 | Heck et al. |
| 2014/0032206 | A1 | 1/2014 | Grieves et al. |
| 2014/0334691 | A1* | 11/2014 | Cho ................... G06O 30/0631 382/110 |
| 2015/0134337 | A1* | 5/2015 | Seo ....................... G06F 16/243 704/254 |

FOREIGN PATENT DOCUMENTS

| | | |
|---|---|---|
| JP | 10-070602 A A1 | 3/1998 |
| KR | 10-2005-0020911 A | 3/2005 |
| KR | 10-2010-0078789 A | 7/2010 |
| KR | 10-0989233 B1 | 10/2010 |
| KR | 10-2011-0092124 A | 8/2011 |
| KR | 10-1134597 B1 | 4/2012 |
| KR | 10-2015-0055448 A | 5/2015 |

OTHER PUBLICATIONS

Office Action dated Mar. 26, 2020, issued in Chinese Patent Application No. 201680065412.0.

* cited by examiner

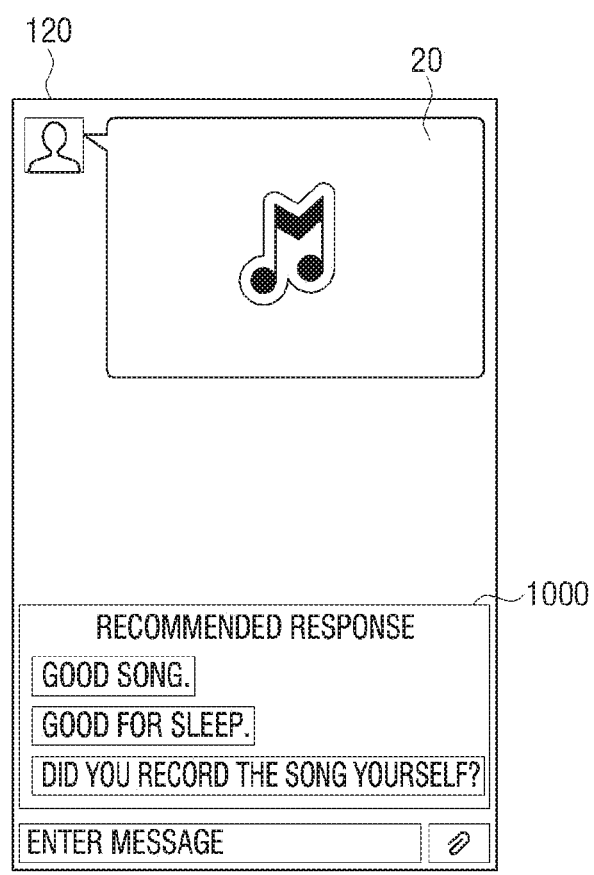

FIG. 9

| IMAGE | FOOD IMAGE | IT LOOKS DELICIOUS. |
| | | WHERE IS THE RESTAURANT? |
| | | DID YOU MAKE THE FOOD YOURSELF? |
| | PERSON IMAGE | ⋮ |
| ⋮ | ⋮ | ⋮ |
| VIDEO | MUSIC VIDEO | ⋮ | the received message is the multimedia message by analyzing the received message.

USER TERMINAL DEVICE FOR RECOMMENDING RESPONSE TO A MULTIMEDIA MESSAGE BASED ON AGE OR GENDER, AND METHOD THEREFOR

TECHNICAL FIELD

Apparatuses and methods consistent with the present disclosure relate to a user terminal device for recommending a response message and a method therefor, and more particularly, to a user terminal device for receiving a multimedia message and recommending a response message and a method therefor.

BACKGROUND ART

In accordance with the development of electronic technology, various types of electronic products have been developed and spread, and messages have been transmitted between electronic devices including various communication functions. Recently, a function of providing a recommended response corresponding to the received message has also been provided. However, there was also a case in which a recommended response may not be provided depending on a kind of received message.

FIGS. 1A and 1B are views for describing the related art.

FIG. 1A illustrates a recommended response in a case of receiving a text message. An electronic device provides a recommended response corresponding to a text message transmitted by the other party using a natural language processing technology. The natural language processing technology means a technology of processing a language that a human being uses for communication to be understood by a computer or a technology of expressing information processed by a computer in a language that a human being uses for communication.

FIG. 1B illustrates a case of receiving a message including an image. In the related art, only a text analysis is possible, such that a recommended response to a message including a multimedia such as the image may not be provided.

Therefore, the necessity for a method capable of providing a recommended response even in a case of receiving a multimedia message has increased.

DISCLOSURE

Technical Problem

The present disclosure provides a user terminal device for recommending a response message corresponding to a received multimedia message, and a method therefor.

Technical Solution

According to an aspect of the present disclosure, a user terminal device includes: a communicator configured to receive a message from another electronic device by performing communication with another electronic device; a display configured to display the received message; and a processor configured to control the display to display a recommended response list corresponding to a type of content included in a multimedia message including at least one of an image, a sound, and a video when it is decided that the received message is the multimedia message by analyzing the received message.

The processor may extract detailed information of the type of content by analyzing the multimedia message, and display a recommended response list corresponding to the extracted detailed information.

The processor may display the recommended response list corresponding to the multimedia message on the basis of a content of a message transmitted or received to or from a user of another electronic device before the multimedia message is received.

The processor may display the recommended response list corresponding to the multimedia message on the basis of at least one of the type of content and a context of a user at a point in time in which the multimedia message is received.

The processor may determine the context of the user on the basis of at least one of a function activated in the user terminal device, a sensed result by at least one sensor included in the user terminal device, a schedule registered in the user terminal device, and a use behavior pattern in the user terminal device.

The processor may display the recommended response list corresponding to a type of multimedia message on the basis of at least one of an age and a gender of a user of the user terminal device.

In the case in which a first type of content and a second type of content different from the first type of content are included in the multimedia message, the processor may display a recommended response list corresponding to at least one of the first type of content and the second type of content.

The user terminal device may further include a storage configured to store mapping information on mapping between the type of content and the recommended response list corresponding to the type of content, wherein the processor displays the recommended response list corresponding to the type of content included in the multimedia message on the basis of the mapping information stored in the storage when the multimedia message is received.

The processor may store a user's response to the multimedia message for each of types of contents to update the mapping information.

The processor may display at least one of a first graphic user interface (GUI) for transmitting each of one or more responses included in the recommended response list and a second GUI for editing each of one or more responses.

According to another aspect of the present disclosure, a method for recommending a response message of a user terminal device includes: receiving a message from another electronic device by performing communication with another electronic device; displaying the received message; and displaying a recommended response list corresponding to a type of content included in a multimedia message including at least one of an image, a sound, and a video when it is decided that the received message is the multimedia message by analyzing the received message.

The displaying of the recommended response list may include: extracting detailed information of the type of content by analyzing the multimedia message; and displaying a recommended response list corresponding to the extracted detailed information.

In the displaying of the recommended response list, the recommended response list may be generated in real time or be generated by searching a mapping table.

In the displaying of the recommended response list, detailed information of the type of content may be extracted by analyzing the multimedia message, and a recommended response list corresponding to the extracted detailed information may be displayed.

In the displaying of the recommended response list, the recommended response list corresponding to the multimedia message may be displayed on the basis of a content of a message transmitted or received to or from a user of another electronic device before the multimedia message is received.

In the displaying of the recommended response list, the recommended response list corresponding to the multimedia message may be displayed on the basis of at least one of the type of content and a context of a user at a point in time in which the multimedia message is received.

The method for recommending a response message may further include determining the context of the user on the basis of at least one of a function activated in the user terminal device, a sensed result by at least one sensor included in the user terminal device, a schedule registered in the user terminal device, and a use behavior pattern in the user terminal device.

In the displaying of the recommended response list, the recommended response list corresponding to the type of multimedia message may be displayed on the basis of at least one of an age and a gender of a user of the user terminal device.

In the displaying of the recommended response list, in the case in which a first type of content and a second type of content different from the first type of content are included in the multimedia message, the recommended response list corresponding to at least one of the first type of content and the second type of content may be displayed.

In the displaying of the recommended response list, the recommended response list corresponding to the type of content included in the multimedia message may be displayed on the basis of mapping information on mapping between the type of content and the recommended response list corresponding to the type of content, when the multimedia message is received.

The method for recommending a response message may further include storing a user's response to the multimedia message for each of types of contents to update the mapping information.

In the displaying of the recommended response list, at least one of a first GUI for transmitting each of one or more responses included in the recommended response list and a second GUI for editing each of one or more responses may be displayed.

Advantageous Effects

According to the diverse exemplary embodiments of the present disclosure as described above, the user terminal device provides the recommended response list corresponding to the type of content included in the multimedia message, such that the user may easily transmit the response message even in the case of receiving the multimedia message.

DESCRIPTION OF DRAWINGS

FIGS. 3A to 3C are views for describing an example of a method for displaying a recommended response list;

FIG. 9 is a view for describing mapping information on mapping between types of contents and recommended response lists corresponding to the types of contents according to an exemplary embodiment of the present disclosure;

BEST MODE

Figure 1A:
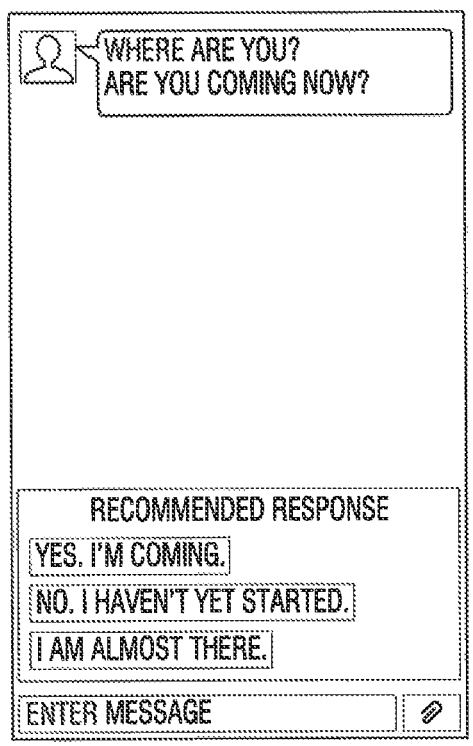
FIGS. 1A and 1B are views for describing the related art.
Figure 1B:
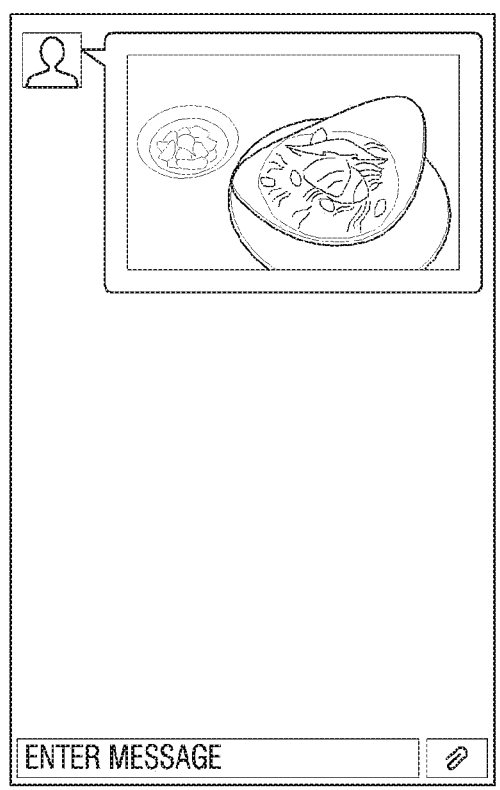

Hereinafter, various exemplary embodiments of the present disclosure will be described with reference to the accompanying drawings. It is to be understood that contents mentioned in the present disclosure do not limit the scope of the present disclosure to specific exemplary embodiments, but include all modifications, equivalents, and substitutions of exemplary embodiments. Throughout the accompanying drawings, similar components will be denoted by the same or similar reference numerals.

In addition, expressions such as "first", "second", and the like, used in the present disclosure will be used to distinguish various components from each other regardless of a sequence or importance of the respective components. Therefore, a sequence or importance of corresponding components is not limited by these expressions. For example, a first component may be named a second component and the second component may also be similarly named the first component, without departing from the scope of the present disclosure.

In addition, when it is mentioned that one component (for example, a first component) is operatively or communicatively coupled or connected to another component (for example, a second component), it is to be understood that one component is directly coupled to another component or is indirectly coupled to another component through the other component (for example, a third component). On the other hand, when it is mentioned that any component (for example, a first component) is "directly coupled" or "directly connected" to another component (for example, a second component), it is to be understood that the other component (for example, a third component) does not exist between any component and another component.

Terms used in the present disclosure will be used to describe specific exemplary embodiments rather than restricting the scope of other exemplary embodiments. In addition, in the present disclosure, singular forms may be used for convenience of explanation. However, these singular forms are intended to include plural forms unless clearly indicated otherwise in a context. Further, terms used in the disclosure may have the same meanings as those generally understood by those skilled in the art. Terms defined in a general dictionary among terms used in the present disclosure may be interpreted as meanings that are the same as or similar to meanings within a context of the related art, and are not interpreted as ideal or excessively formal meanings unless clearly defined in the present disclosure. In some cases, terms may not be interpreted to exclude exemplary embodiments of the present disclosure even though they are defined in the present disclosure.

Hereinafter, various exemplary embodiments of the present disclosure will be described in detail with reference to the accompanying drawings.

Figure 2A:
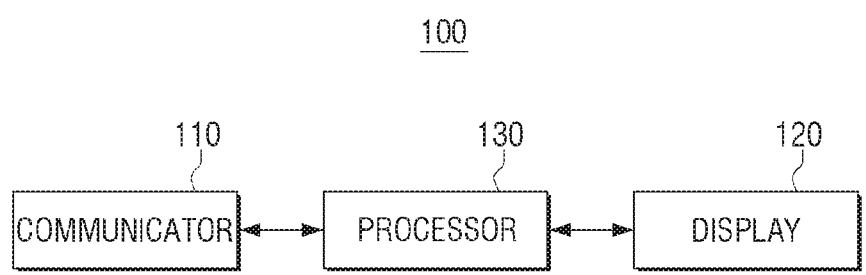
FIGS. 2A and 2B are block diagrams illustrating components of a user terminal device according to an exemplary embodiment of the present disclosure.
Figure 2B:
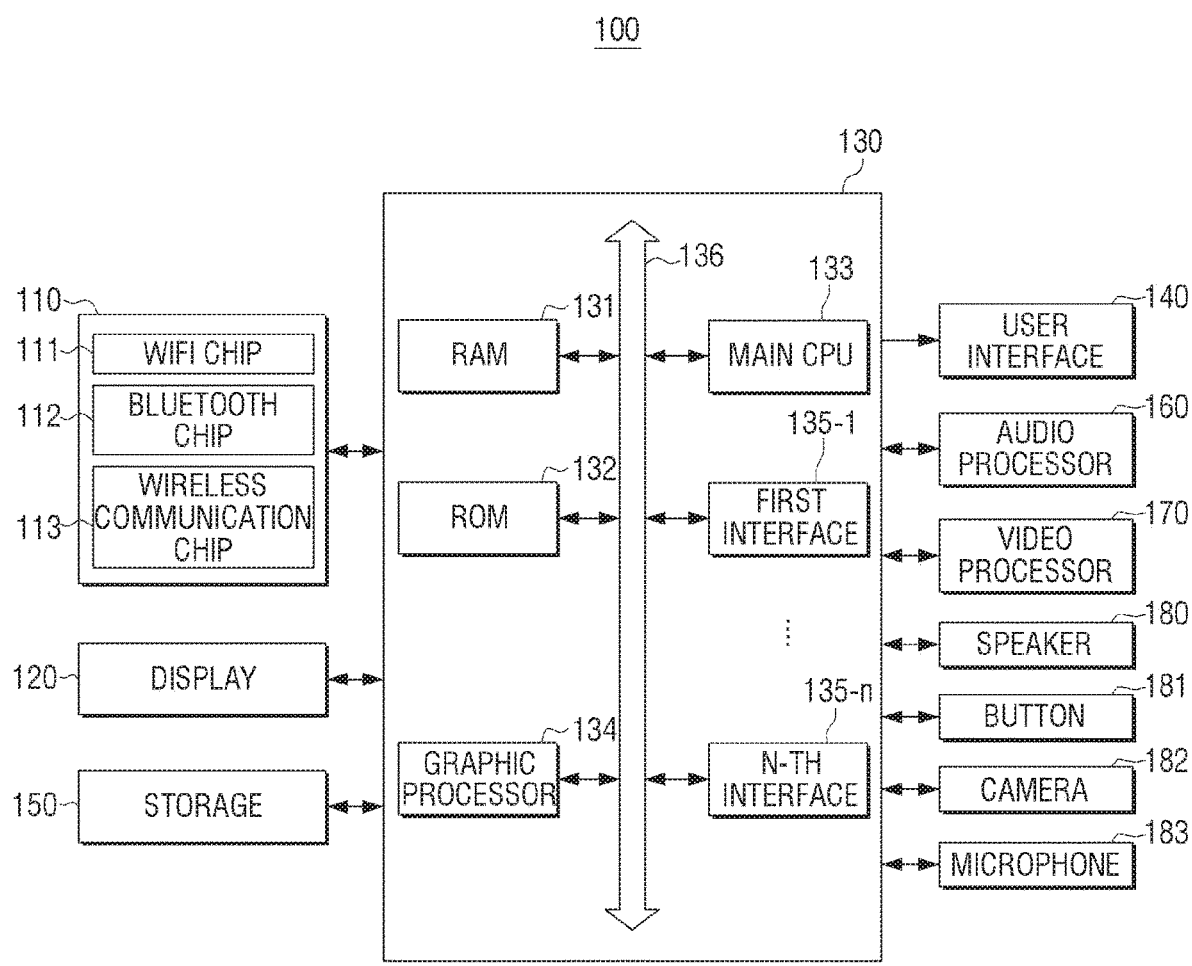

FIGS. 2A and 2B are block diagrams illustrating components of a user terminal device 100 according to an exemplary embodiment of the present disclosure. The user terminal device 100 may be various electronic devices. For example, the user terminal device 100 may be implemented by various devices such as a digital camera, an MP3 player, a portable multimedia player (PMP), a smartphone, a cellular phone, a smart glasses, a tablet personal computer (PC), a smart watch, and the like.

The user terminal device 100 may receive a message from another electronic device, and display the received message. In addition, the user terminal device 100 may display a recommended response list corresponding to the received message. The user terminal device 100 may transmit a recommended response selected in the recommended response list or a message created by a user to another electronic device.

As illustrated in FIG. 2A, the user terminal device 100 includes a communicator 110, a display 120, and a processor 130.

The communicator 110 may perform communication with another electronic device.

In detail, the communicator 110 may receive a message from another electronic device or transmit a message to another electronic device. The message received from another electronic device or transmitted to another electronic device may include at least one of an image, a sound, and a video as well as a text.

The communicator 110 may perform unidirectional communication or bidirectional communication with another electronic device. In the case in which the communicator 110 performs the unidirectional communication, the communicator 110 may receive a signal from another electronic device. In the case in which the communicator 110 performs the bidirectional communication, the communicator 110 may receive a signal from another electronic device, and may transmit a signal to another electronic device.

The display 120 may display the received message or the message to be transmitted by a control of the processor 130. For example, the display 120 may display the text and the image included in the message received from another electronic device. In addition, the display 120 may display a recommended response list corresponding to the received message. However, the display 120 is not limited thereto, but may also display a video, or the like, unrelated to the message.

In addition, the display 120 may be implemented by a liquid crystal display (LCD) panel, an organic light emitting diode (OLED), or the like, but is not limited thereto. In addition, the display 120 may also be implemented by a flexible display, a transparent display, or the like, in some cases.

The processor 130 may decide whether or not a content is included in the received message by analyzing the received message. For example, the processor 130 may decide that the content is included in the received message using tag information included in the content. Alternatively, the processor 130 may decide whether or not a content is included in the received message on the basis of capacity information of the content. However, a method for deciding whether or not the content is included in the received message by the processor 130 is not limited thereto.

When it is decided that the received message is a multimedia message including at least one of the image, the sound, and the video, the processor 130 may control the display 120 to display a recommended response list corresponding to a type of content included in the multimedia message. For example, when a photo is included in the received message, the processor 130 may display a recommended response list such as "What is the photo?", "Did you go to the beach for pleasure?", "Jeju island.", or the like, by analyzing the photo.

The processor 130 may extract detailed information of the type of content by analyzing the multimedia message. For example, in the case in which the multimedia message includes the image, the processor 130 may compare at least one of color information, contrast information, and brightness information between pixels to extract a contour, and decide which object is included in the image on the basis of the extracted contour. The processor 130 may extract detailed information such as a person image, a food image, a landscape image, and the like, on the basis of the object included in the image.

Alternatively, the processor 130 may extract detailed information of the image by analyzing only the color information in the image. For example, in the case in which a large amount of flesh tint-based colors are included in the image, the processor 130 may decide that the image is the person image. Alternatively, in the case in which a large amount of green-based colors are included in the image, the processor 130 may decide that the image is the landscape image.

In the case in which the multimedia message includes the sound, the processor 130 may extract detailed information of the sound using tag information included in the sound. For example, the processor 130 may decide that the sound is a sound source of a specific singer on the basis of the tag information included in the sound. Alternatively, the processor 130 may decide whether or not the sound is a person voice, an animal cry, music, a mechanical sound, and the like, by analyzing the sound itself.

In the case in which the multimedia message includes the video, the processor 130 may extract detailed information of the video using tag information included in the video. For example, the processor 130 may decide that the video is one of movies on the basis of the tag information included in the video.

Alternatively, the processor 130 may extract detailed information by analyzing a sound included in the video. For example, in the case in which most of the sounds included in the video are music, the processor 130 may decide that the video is a music video.

Alternatively, the processor 130 may extract detailed information by analyzing frames of the video. For example, when a text is recognized at a lower end of the frames of the video, the processor 130 may decide that the video is a movie.

Alternatively, the processor 130 may decide detailed information on the basis of a reproduction time of the video. For example, the processor 130 may decide that the video is a music video when the reproduction time of the video is about five minutes, decide that the video is a drama when the reproduction time of the video is about one hour, and decide that the video is a movie when the reproduction time of the video is about two hours.

That is, as described above, the processor 130 may extract the detailed information on the basis of metadata on the content or a content of an object recognized from the image or the video. The processor 130 may detect a song title, a singer name, an actor name, or the like, as the metadata on the content from a database buildup in advance. Alternatively, the processor 130 may detect an animal, a building name, a beach, a food, or the like, as the object recognized from the image or the video.

The processor 130 may display a recommended response list corresponding to the extracted detailed information. For example, the processor 130 may display a recommended response list such as "Who is it in the photo?" when it is decided that the photo is a person photo, "Suzy is beautiful." when a specific person is recognized, or the like, by analyzing the photo included in the received message. The user terminal device 100 may store the recommended response list or receive the recommended response list from a server device.

Meanwhile, the processor 130 may display a recommended response list corresponding to the multimedia message on the basis of a content of a message transmitted or received to or from a user of another electronic device before the multimedia message is received. However, the processor 130 may also consider only a content of a message for a predetermined time before the multimedia message is received.

Alternatively, the processor 130 may display a recommended response list corresponding to the multimedia message on the basis of at least one of the type of content and a context of a user at a point in time in which the multimedia message is received.

Here, the processor 130 may determine the context of the user on the basis of at least one of a function activated in the user terminal device 100, a sensed result by at least one sensor included in the user terminal device 100, a schedule registered in the user terminal device 100, and a use behavior pattern of the user terminal device.

The processor 130 may generate the use behavior pattern by analyzing a use pattern of the user terminal device. For example, when use behavior in which a video reproduction application is executed from 8:00 pm to 10:00 pm is repeated for a predetermined point in time, the processor 130 may generate this information as the use behavior pattern.

Meanwhile, the processor 130 may display a recommended response list corresponding to a type of multimedia message on the basis of at least one of an age and a gender of the user of the user terminal device 100.

In addition, in the case in which a first type of content and a second type of content different from the first type of content are included in the multimedia message, the processor 130 may display a recommended response list corresponding to at least one of the first type of content and the second type of content.

In addition, the user terminal device 100 may further include a storage storing mapping information on mapping between types of contents and recommended response lists corresponding to the types of contents, and the processor 130 may display a recommended response list corresponding to the type of content included in the multimedia message on the basis of the mapping information stored in the storage when the multimedia message is received.

Here, the processor 130 may store a user's response to the multimedia message for each of the types of contents to update the mapping information.

Alternatively, the processor 130 may automatically generate and display the recommended response list corresponding to the type of content included in the multimedia message in real time without using the mapping information stored in the storage. For example, the processor 130 may automatically generate the recommended response list corresponding to the type of content in real time in consideration of at least one of detailed information of the content, a function activated in the user terminal device, a sensed result by a sensor, schedule information, user information, a dialogue flow, a use behavior pattern as well as the type of content.

Meanwhile, the processor 130 may display at least one of a first graphic user interface (GUI) for transmitting each of one or more responses included in the recommended response list and a second GUI for editing each of one or more responses.

FIG. 2B is a block diagram illustrating an example detailed components of the user terminal device 100. As illustrated in FIG. 2B, the user terminal device 100 includes the communicators 110, the display 120, the processor 130, a user interface 140, a storage 150, an audio processor 160, a video processor 170, a speaker 180, a button 181, a camera 182, and a microphone 183. A detailed description for components overlapping those illustrated in FIG. 2A among components illustrated in FIG. 2B is omitted.

The processor 130 generally controls an operation of the user terminal device 100 using various programs stored in the storage 150.

In detail, the processor 130 includes a random access memory (RANI) 131, a read only memory (ROM) 132, a main central processing unit (CPU) 133, a graphic processor 134, first to n-th interfaces 135-1 to 135-n, and a bus 136.

The RAM 131, the ROM 132, the main CPU 133, the graphic processor 134, the first to n-th interfaces 135-1 to 135-n, and the like, may be connected to one another through the bus 136.

The first to n-th interfaces 135-1 to 135-n are connected to the various components described above. One of the interfaces may be a network interface connected to an external device through a network.

The main CPU 133 accesses the storage 150 to perform booting using an operating system (O/S) stored in the storage 150. In addition, the main CPU 133 performs various operations using various programs, or the like, stored in the storage 150.

An instruction set for booting a system, or the like, is stored in the ROM 132. When a turn-on command is input to supply power to the main CPU 133, the main CPU 133 copies the operating system (O/S) stored in the storage 150 to the RAM 131 depending on an instruction stored in the ROM 132, and execute the O/S to boot the system. When the booting is completed, the main CPU 133 copies various application programs stored in the storage 150 to the RAM 131, and executes the application programs copied to the RAM 131 to perform various operations.

The graphic processor 134 renders a screen including various objects such as an icon, an image, a text, and the like, using a calculator (not illustrated) and a renderer (not illustrated). The calculator (not illustrated) calculates attribute values such as coordinate values at which the respective objects will be displayed, forms, sizes, colors, and the like, of the respective objects depending on a layout of the screen on the basis of a received control command. The renderer (not illustrated) renders screens of various layouts including objects on the basis of the attribute values calculated in the calculator (not illustrated). The screen rendered by the renderer (not illustrated) is displayed on a display region of the display 110.

Meanwhile, the operation of the processor 130 described above may be performed by a program stored in the storage 150.

The storage 150 stores various data such as an operating system (O/S) software module for driving the user terminal device 100, a message analyzing module, an image analyzing module, a sound analyzing module, a video analyzing module, a recommended response list generating module, and the like.

In this case, the processor 130 may display the recommended response list corresponding to the type of content included in the received message on the basis of the information stored in the storage 150.

The user interface 140 receives various user interactions. In the case in which the user terminal device 100 is implemented by a touch based portable terminal, the user interface 140 may also be implemented in a form of a touch screen forming a layer structure together with a touch pad. In this case, the user interface 140 may be used as the display 110 described above.

A touch sensor (not illustrated) may be implemented by a capacitive touch sensor or a resistive touch sensor. The capacitive touch sensor means a touch sensor using a manner of calculating a touch coordinate by sensing micro electricity excited to a user's body when a part of the user's body touches a surface of the display, using a dielectric material coated on the surface of the display. The resistive touch sensor means a touch sensor using a manner of calculating a touch coordinate by sensing a current flowing due to a contact between two electrode plates embedded in the user terminal device 100 at a touch point in the case in which the user performs a touch. In addition to the manner described above, an infrared sensing manner, a surface ultrasonic wave conduction manner, an integral tension measuring manner, a piezoelectric effect manner, or the like, may be used to sense a touch interaction.

The audio processor 160 is a component performing processing for audio data. In the audio processor 160, various kinds of processing such as decoding, amplifying, noise filtering, and the like, for the audio data may be performed.

The video processor 170 is a component performing processing for video data. In the video processor 170, various kinds of image processing such as decoding, scaling, noise filtering, frame rate converting, resolution converting, and the like, for the video data may be performed.

The speaker 180 is a component outputting various notification sounds, an audio message, or the like, as well as various audio data processed by the audio processor 160.

The button 181 may be various types of buttons such as a mechanical button, a touch pad, a wheel, and the like, formed in any region such as a front surface portion, a side surface portion, a rear surface portion, and the like, of a body appearance of the user terminal device 100.

The camera 182 is a component for capturing a still image or a video depending on a control of the user. The camera 182 may be implemented by a plurality of cameras such as a front camera and a rear camera.

The microphone 183 is a component for receiving a user' voice or other sounds and converting the user's voice or other sounds into audio data.

Hereinafter, a basic configuration and various exemplary embodiments for assisting in the understanding of the present disclosure will be described.

Figure 3A:
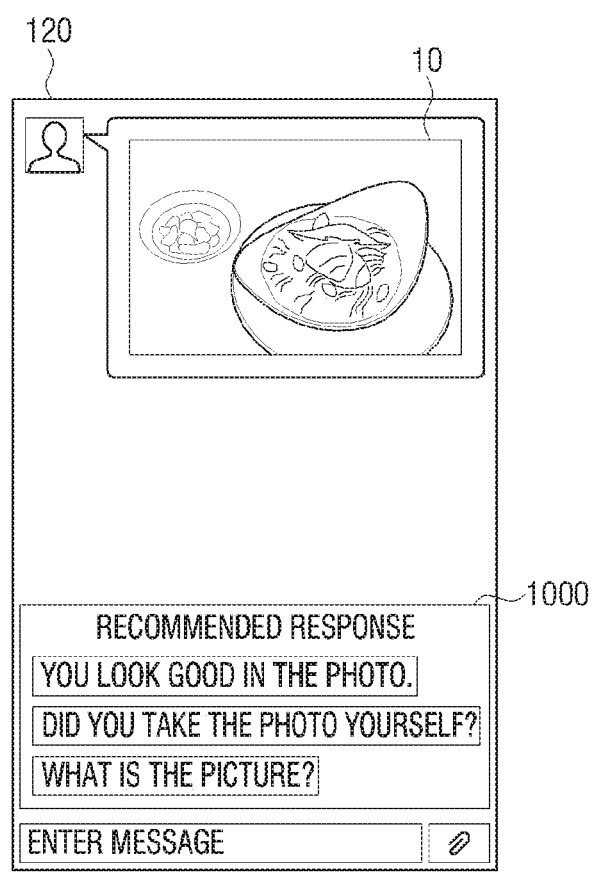
Figure 3C:

FIGS. 3A to 3C are views for describing an example of a method for displaying a recommended response list 1000. The processor 130 may control the display 120 to display a recommended response list 1000 corresponding to a type of content included in a multimedia message including at least one of an image 10, a sound 20, and a video 30 when it is decided that the received message is the multimedia message by analyzing the received message.

FIG. 3A illustrates a recommended response list 1000 in the case in which the type of content included in the received message is the image 10. For example, the processor 130 may display the recommended response list 1000 corresponding to the image 10 when it is decided that the received message is a multimedia message including the image 10 by analyzing the received message. Messages such as "You look good in the photo.", "Did you take the photo yourself?", and "What is the picture?" may be included in the recommended response list 1000.

FIG. 3B illustrates a recommended response list 1000 in the case in which the type of content included in the received message is the sound 20. For example, the processor 130 may display the recommended response list 1000 corresponding to the sound 20 when it is decided that the received message is a multimedia message including the sound 20 by analyzing the received message. Messages such as "Good song.", "Good for sleep.", and "Did you record the song yourself?" may be included in the recommended response list 1000. Although a musical note indicating the sound 20 is illustrated in FIG. 3B, the present disclosure is not limited thereto. For example, the sound 20 included in the received message is an mp3 file, and a corresponding image may be displayed on the basis of tag information included in the mp3 file.

In the case in which the type of content included in the received message is the sound 20, the processor 130 may reproduce the sound 20 depending on a user's input touching the musical note illustrated in FIG. 3B. Alternatively, when reception of the sound 20 is completed, the processor 130 may reproduce the sound 20 even though the user's input does not exist.

FIG. 3C illustrates a recommended response list 1000 in the case in which the type of content included in the received message is the video 30. For example, the processor 130 may display the recommended response list 1000 corresponding to the video 30 when it is decided that the received message is a multimedia message including the video 30 by analyzing the received message. Messages such as "I'll enjoy the video.", "What is the video?", and "Who did take the video?", may be included in the recommended response list 1000. Although a representative thumbnail indicating the video 30 and a GUI for reproduction are illustrated in FIG. 3B, the present disclosure is not limited thereto. For example, the processor 130 may also display only the GUI for reproduction. Alternatively, the processor 130 may receive an image corresponding to tag information of the video 30 from an external device, and display the received image.

In the case in which the type of content included in the received message is the video 30, the processor 130 may reproduce the video 30 depending on a user's input touching the GUI for reproduction illustrated in FIG. 3C. Alternatively, when reception of the video 30 is completed, the processor 130 may reproduce the video even though the user's input does not exist.

Although a case of automatically receiving the corresponding content when the multimedia message including any one of the image 10, the sound 20, and the video 30 is received is described in FIGS. 3A to 3C, the present disclosure is not limited thereto. For example, the processor 130 first receives a text included in the message, and may inform a user that any one of the image 10, the sound 20, and the video 30 is included in the message. When a user's input intending to receive a corresponding content exists, the processor 130 may receive the correspond content and provide the corresponding content to the user.

Figure 4A:
FIGS. 4A and 4B are views for describing an example of a method for displaying a recommended response list corresponding to detailed information of a type of content.
Figure 4B:
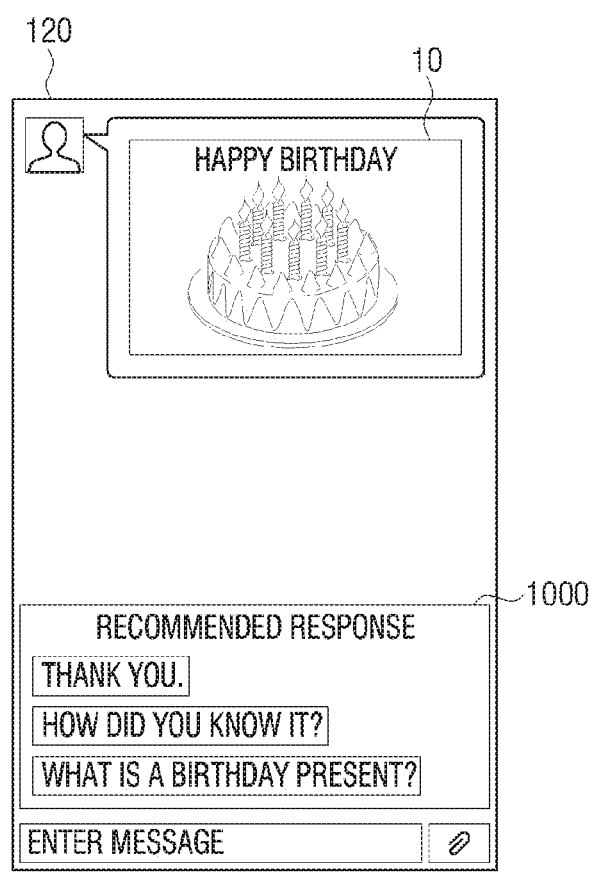

FIGS. 4A and 4B are views for describing an example of a method for displaying a recommended response list corresponding to detailed information of a type of content. The processor 130 may extract detailed information of the type of content by analyzing the multimedia message, and display a recommended response list 1000 corresponding to the extracted detailed information.

FIG. 4A illustrates a recommended response list 1000 corresponding to detailed information of the image 10. For example, the processor 130 may extract that a person is included as the detailed information of the image 10. In addition, the processor 130 may display a recommended response list 1000 corresponding to a person image. Messages such as "Good look in the photo~", "Anyone I know?", and "He/She is an entertainer A. He/she is so popular these days." may be included in the recommended response list 1000. As compared with FIG. 3A, the processor 130 may provide a more specific recommended response list 1000 on the basis of the extracted information.

Although a case in which the person image is extracted as the detailed information of the image 10 is illustrated in FIG. 4A, the present disclosure is not limited thereto. For example, the processor 130 may extract a food image, a landscape image, an animal image, and the like, as the detailed information of the image 10.

The processor 130 may use various methods as a method for extracting the detailed information from the image 10. For example, the processor 130 may decide a target included in the image by analyzing the image itself. Alternatively, the processor 130 may extract the detailed information using tag information, or the like, included in an image file.

FIG. 4B illustrates a recommended response list 1000 corresponding to text information included in the image 10 itself. For example, the processor 130 may extract a text such as "HAPPY BIRTHDAY" in the image 10 by analyzing the image 10. The processor 130 may display a recommended response list 1000 corresponding to the extracted text information. Messages such as "Thank you~", "How did you know?", and "What is a birthday present?" may be included in the recommended response list 1000.

Alternatively, the processor 130 may display the recommended response list 1000 on the basis of the type of content and a detailed attribute without considering the text information. For example, the processor 130 may extract a cake model by analyzing the image 10, and display the recommended response list 1000 from the extracted cake model.

Alternatively, the processor 130 may display the recommended response list 1000 in consideration of both of the type of content and the text information. For example, in FIG. 4B, the processor 130 may display the recommended response list 1000 such as "Thank you~ What a pretty birthday cake~".

Although only the image 10 is described in FIGS. 4A and 4B, the same method may also be applied to the sound 20 and the video 30. For example, the processor 130 may extract a person sound, an animal sound, music, and a machine sound, and the like, as detailed information of the sound 20. Alternatively, the processor 130 may extract a music video, a movie, an animation, a trailer, and the like, as detailed information of the video 30.

The processor 130 may extract the detailed information by analyzing the sound 20 itself or the video 30 itself or may extract the detailed information using tag information of the sound 20 or the video 30.

The processor 130 may extract a text from utterance of a person included in the sound 20, and use the extracted text as the detailed information. Alternatively, the processor 130 may extract a text included in each frame image of the video or extract a text from utterance of a person included in a sound of the video 30, and use the extracted text as the detailed information.

Figure 5:
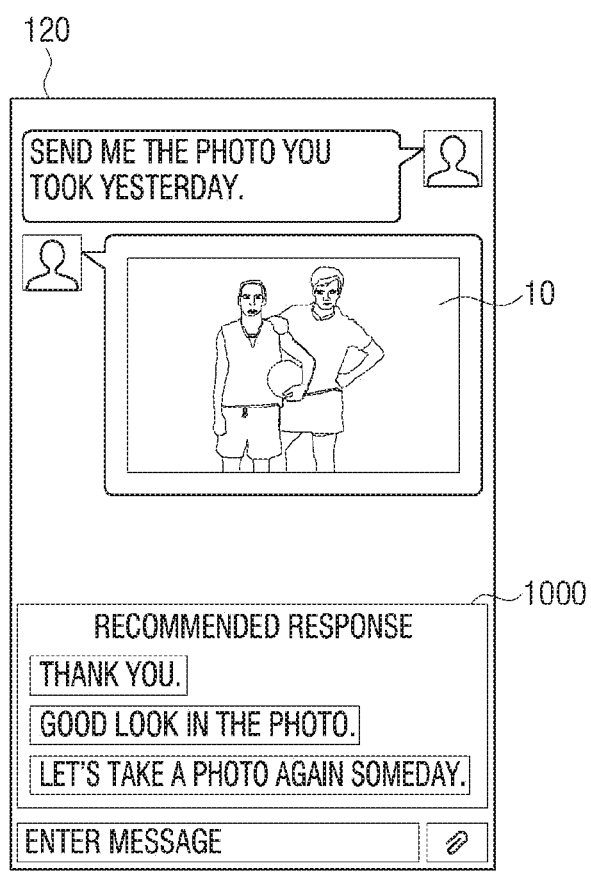
FIG. 5 is a view for describing a method for providing a recommended response list in consideration of a content of a message before a multimedia message is received according to an exemplary embodiment of the present disclosure.

FIG. 5 is a view for describing a method for providing a recommended response list 1000 in consideration of a content of a message before a multimedia message is received according to an exemplary embodiment of the present disclosure.

As illustrated in FIG. 5, the processor 130 may display the recommended response list 1000 corresponding to the multimedia message on the basis of a content of a message transmitted or received to or from a user of another electronic device before the multimedia message is received. For example, the processor 130 may consider the fact that the user transmits a message such as "Send me the photo you took yesterday" before the multimedia message is received. When the image 10 is included in the received message, the processor 130 may display a recommended response list 1000 such as "Thank you.", "Good look in the photo.", and "Let's take a photo again someday." on the basis of the message transmitted by the user.

The processor 130 may expect reception of the image from a word "photo" by analyzing the message transmitted by the user. When the sound 20 or the video 30 is included in the multimedia message, the processor 130 may display a recommended response list 1000 such as "It seems to be erroneously sent~".

The processor 130 may display a recommended response list 1000 corresponding to the multimedia message on the basis of a content of a message for a predetermined time before the multimedia message is received. For example, the processor 130 may display a recommended response list 1000 corresponding to the multimedia message on the basis of only a content of a message for one hour before the multimedia message is received. The predetermined time may be set by the user.

Figure 6A:
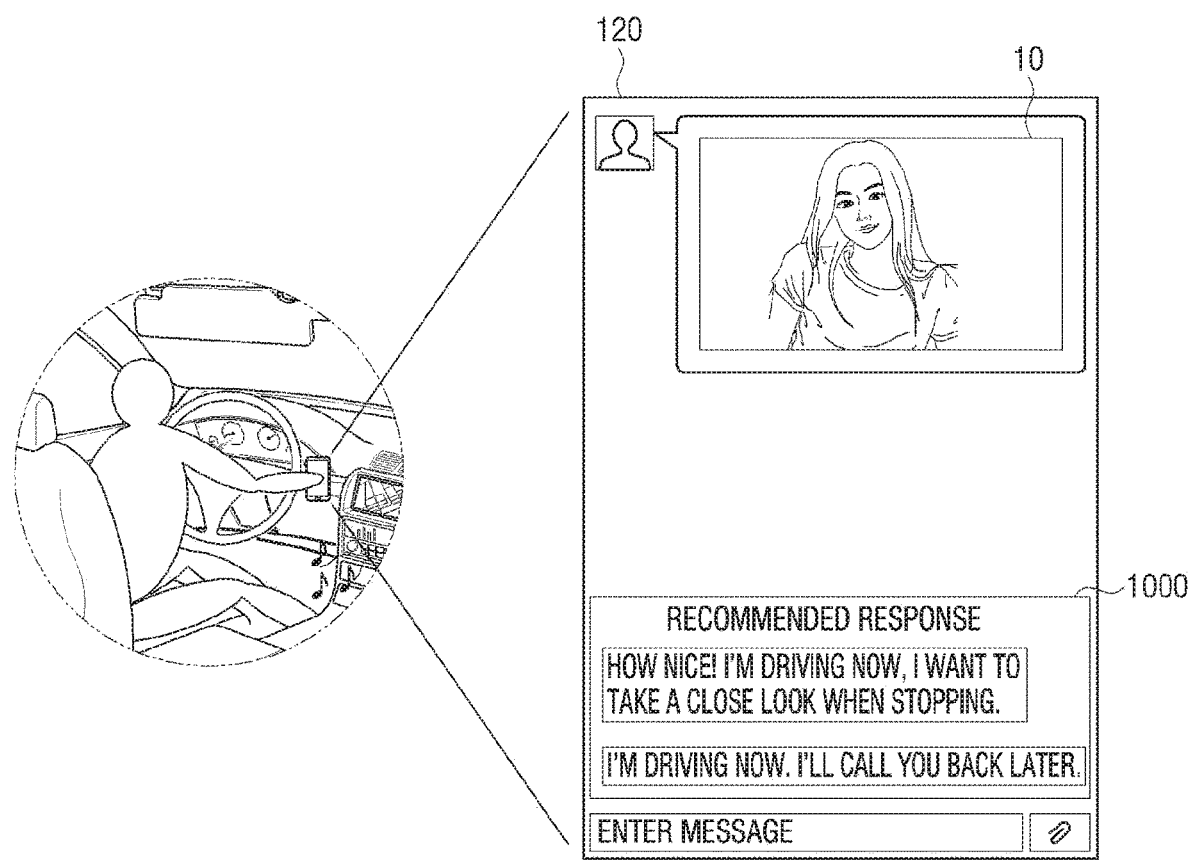
FIGS. 6A and 6B are views for describing an example of a method for displaying a corresponding recommended response list on the basis of a context of a user.
Figure 6B:
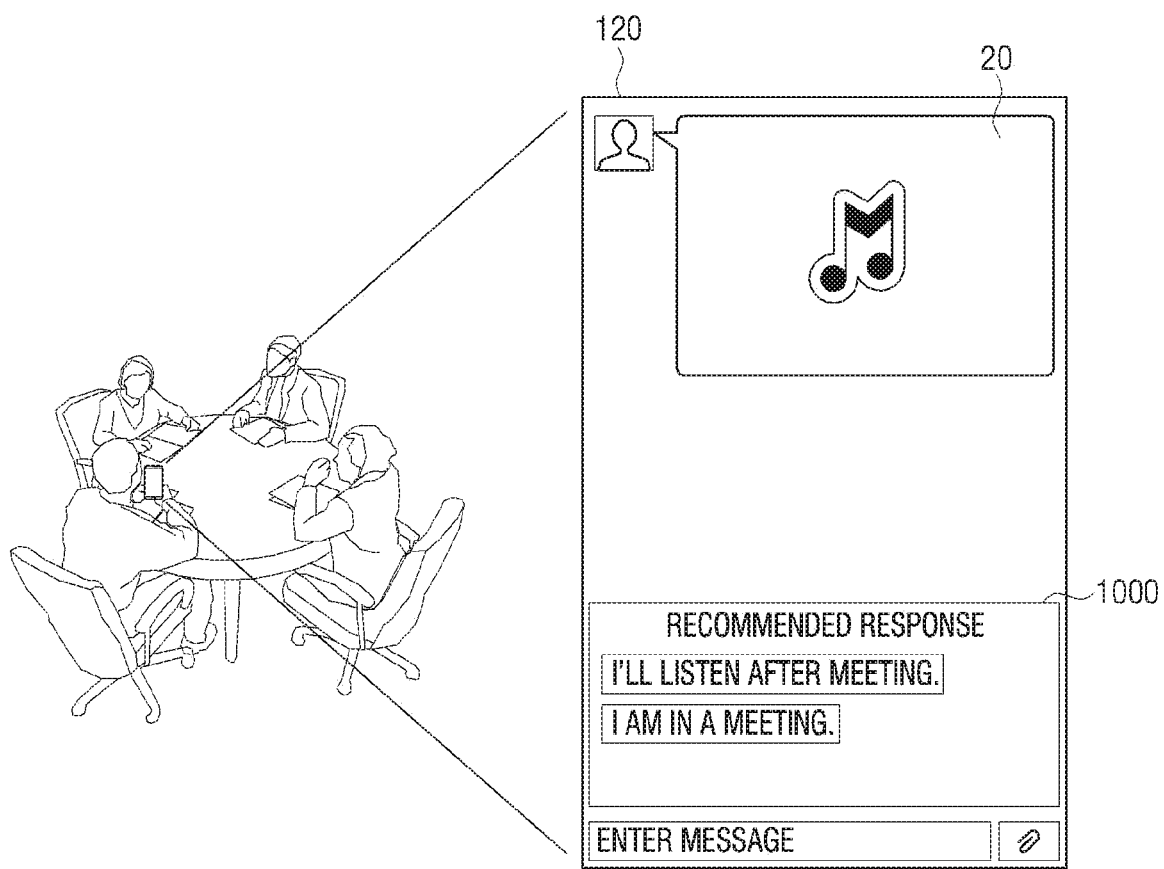

FIGS. 6A and 6B are views for describing an example of a method for displaying a corresponding recommended response list 1000 on the basis of a context of a user. The processor 130 may display a recommended response list 1000 corresponding to the multimedia message on the basis of at least one of the type of content and a context of a user at a point in time in which the multimedia message is received.

The processor 130 may determine the context of the user on the basis of at least one of a function activated in the user terminal device 100, a sensed result by at least one sensor included in the user terminal device 100, a schedule registered in the user terminal device 100, and a use behavior pattern of the user terminal device. For example, in the case in which a global positioning system (GPS) of the user terminal device 100 is activated, the processor 130 may decide that the user is driving. Alternatively, in the case in which it is sensed that the surrounding of the user terminal device 100 is dark using an illumination sensor, the processor 130 may decide that the user is in a movie theater.

Alternatively, the processor 130 may decide that the user is in a meeting on the basis of the schedule registered in the user terminal device 100.

Alternatively, the processor 130 may determine the context of the user on the basis of a use behavior pattern of the user terminal device 100 at normal times. For example, the processor 130 may decide that the user is reading from use behavior information indicating that a news application is executed for one hour from 7:00 am to 8:00 am.

The user may directly set at least one of the function activated in the user terminal device 100, the sensed result by at least one sensor included in the user terminal device 100, and the schedule registered in the user terminal device 100 and a corresponding context of the user. For example, the user may set the context of the user to listen to music, in the case in which a Bluetooth function is activated. Alternatively, the user may set the context of the user to be in his/her sleep, when it is sensed that the surrounding of the user terminal device 100 is dark.

FIG. 6A illustrates a case in which a user receives a multimedia message including an image 10 during driving. The processor 130 may decide that the user is driving as the context of the user since a GPS function is activated at a point in time in which the multimedia message is received. When the user is driving and the image 10 is included in the multimedia message, the processor 130 may display a recommended response list 1000 such as "How nice! I'm driving now, I want to take a close look when stopping." and "I'm driving now. I'll call you back later." in order not to disperse a user's sight line. However, the present disclosure is not limited thereto. When the sound 20 is included in the multimedia message even though the user is driving, the processor 130 may display the recommended response list 1000 without considering the context of the user. The reason is that the sound 20 does not disperse the user's sight line.

FIG. 6B illustrates a case in which a user receives a multimedia message including a sound 20 during meeting. The processor 130 may decide that the user is in a meeting as the context of the user on the basis of the schedule information registered in the user terminal device 100 at a point in time in which the multimedia message is received. When the user is in a meeting and the sound 20 is included in the multimedia message, the processor 130 may display a recommended response list 1000 such as "I'll listen after meeting." and "I am in a meeting." in order not to hinder the meeting of the user. However, the present disclosure is not limited thereto. When the image 10 is included in the multimedia message even though the user is in a meeting, the processor 130 may display the recommended response list 1000 without considering the context of the user. The reason is that the image 10 does not hinder the meeting of the user.

Alternatively, the processor may not consider the context of the user. For example, in the case in which the user is resting at home at a point in time in which the multimedia message is received, the processor 130 may display the recommended response list 1000 in consideration of only the type of content without considering the context of the user. Alternatively, in the case in which the context of the user is not decided, the processor 130 may display the recommended response list 1000 in consideration of only the type of content.

Figure 7A:
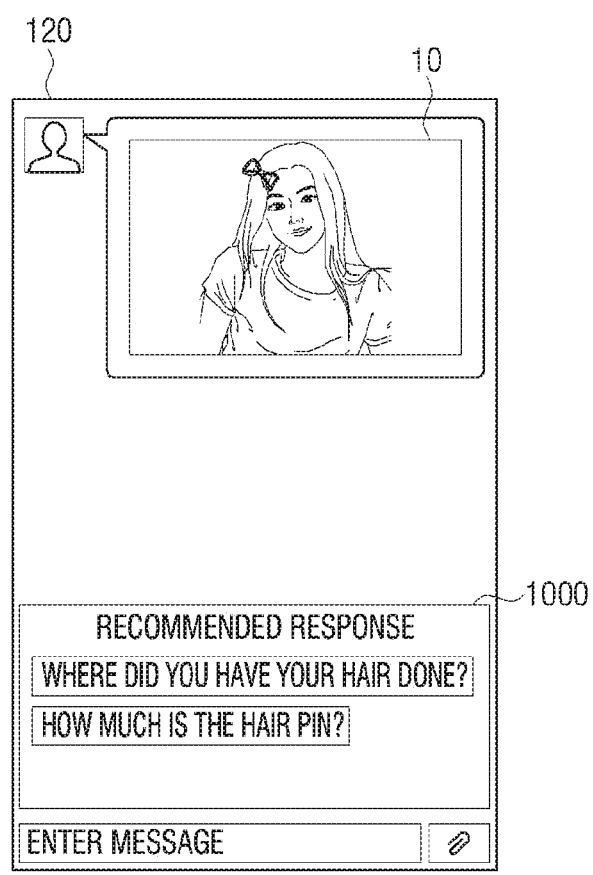
FIGS. 7A and 7B are views for describing an example of a method for displaying a recommended response list on the basis of user information.
Figure 7B:
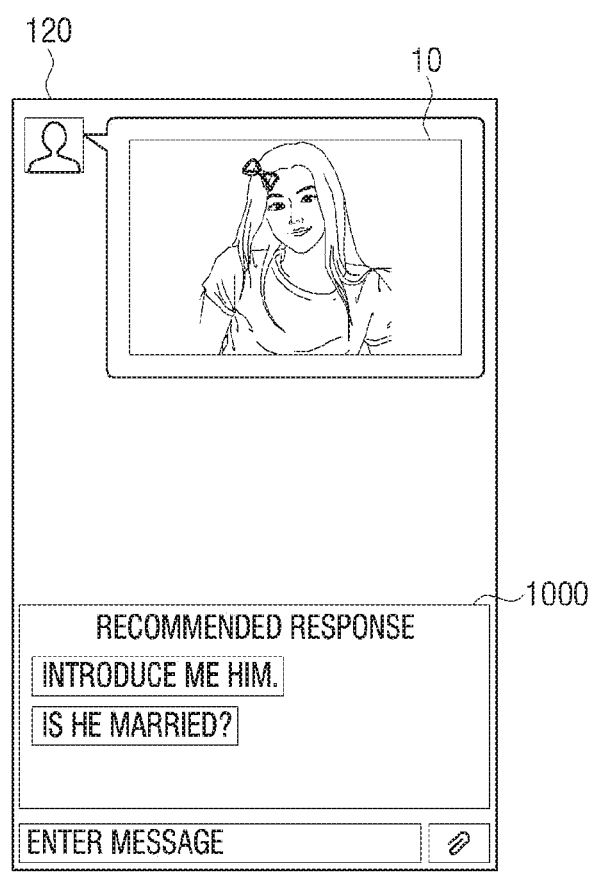

FIGS. 7A and 7B are views for describing an example of a method for displaying a recommended response list on the basis of user information. The processor 130 may display a recommended response list 1000 corresponding to a type of multimedia message on the basis of at least one of an age and a gender of the user of the user terminal device 100.

FIG. 7A illustrates a case in which a female user receives a multimedia message including an image 10. The processor 130 may extract that the type of content is the image 10 and detailed information of the image 10 is a person image by analyzing the multimedia message. The processor 130 may extract that a user is a woman from user information stored in the user terminal device 100, and may display a recommended response list 1000 such as "Where did you have your hair done?" and "How much is the hair pin?" on the basis of the user information.

The processor 130 may use the user information stored in the user terminal device 100, or may receive the user information from an external electronic device. For example, the processor 130 may receive the user information from a communication company to which the user terminal device 100 subscribes. Alternatively, the processor 130 may receive the user information from a server such as a social network service (SNS), or the like, used in the user terminal device 100.

FIG. 7B illustrates a case in which a male user receives a multimedia message including an image 10. The processor 130 may extract that the type of content is the image 10 and detailed information of the image 10 is a person image by analyzing the multimedia message. The processor 130 may decide that a user is a man from user information stored in the user terminal device 100, and may display a recommended response list 1000 such as "Introduce me him." and "Is he married?" on the basis of the user information.

Although a case in which the processor 130 considers the gender as the user information is described hereinabove, the processor 130 may also consider the gender, a school, an occupation, a height, a weight, an annual salary, and an interest as the user information.

In addition, the processor 130 may display the recommended response list 1000 in consideration of information of a user of another electronic device transmitting and receiving a message as well as the user information. For example, in the case in which a message including a ring image is received, the processor 130 may display a recommended response list 1000 such as "Will you buy it for your wife?" when the user of another electronic device is simply a friend. Alternatively, the processor 130 may display a recommended response list 1000 such as "May I buy you it?" when the user of another electronic device is a wife, and display a recommended response list 1000 such as "Do you want to buy it?" and "Ask your husband to buy it" when the user of another electronic device is simply a girlfriend.

Figure 8:
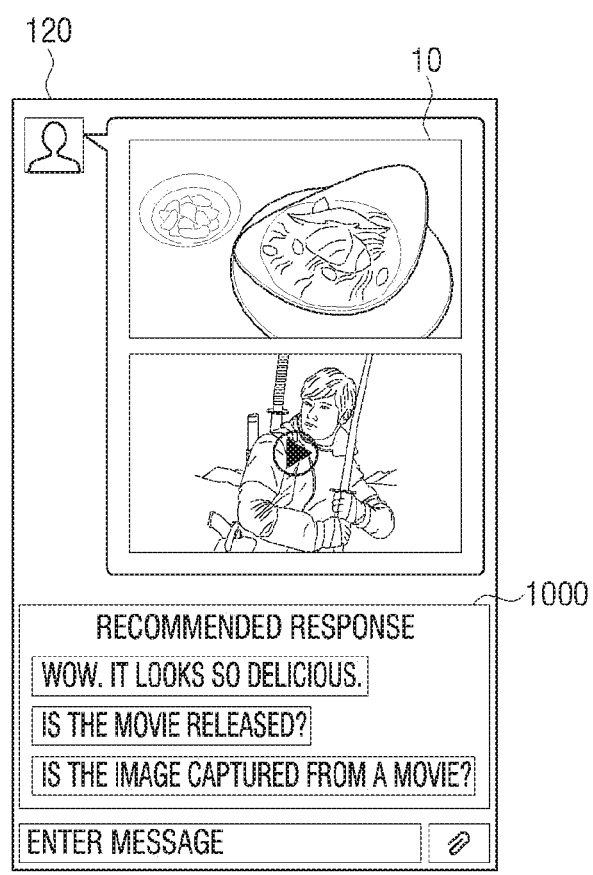
FIG. 8 is a view for describing a case in which a multimedia message including plural types of contents is received according to an exemplary embodiment of the present disclosure.

FIG. 8 is a view for describing a case in which a multimedia message including plural types of contents is received according to an exemplary embodiment of the present disclosure.

As illustrated in FIG. 8, in the case in which a first type of content and a second type of content different from the first type of content are included in the multimedia message, the processor 130 may display a recommended response list 1000 corresponding to at least one of the first type of content and the second type of content. For example, in the case in which an image 10 and a video 30 are included in the multimedia message, the processor 130 may display a recommended response list 1000 such as "Wow. It looks so delicious." corresponding to the image 10 and "Is the movie released?" corresponding to the video 30. Alternatively, the processor 130 may display a recommended response list 1000 such as "Is the image captured from a movie?" in consideration of both of the image 10 and the video 30.

Although a case in which the plural types of contents are different from each other is described in FIG. 8, the present disclosure is not limited thereto. For example, in the case in which the number of first types of contents included in the multimedia message is plural, the processor 130 may display a recommended response list 1000 corresponding to the first types of contents. For example, in the case in which a multimedia message including a plurality of images 10 is received, the processor 130 may display a recommended response list 1000 corresponding to the images 10 Alternatively, the processor 130 may extract detailed information of each of the plurality of images 10, and display a recommended response list 1000 corresponding at least one of a plurality of detailed information.

FIG. 9 is a view for describing mapping information on mapping between types of contents and recommended response lists 1000 corresponding to the types of contents according to an exemplary embodiment of the present disclosure.

As illustrated in FIG. 9, the user terminal device 100 may further include a storage 150 storing mapping information on mapping between types of contents and recommended response lists corresponding to the types of contents, and the processor 130 may display a recommended response list corresponding to the type of content included in the multimedia message on the basis of the mapping information stored in the storage 150 when the multimedia message is received. For example, the types of contents may be divided into categories of an image 10, a sound 20, and a video 30. In addition, each of the types of contents may be divided into sub-categories including detailed information. For example, detailed information on the image 10 may be a food image, a person image, or the like. Recommended responses corresponding to each detailed information may be included in each detailed information. For example, recommended responses such as "It looks delicious.", "Where is the restaurant?", and "Did you make the food yourself?" may be included in the food image.

Meanwhile, although not illustrated in the drawing, specific categories for the abovementioned exemplary embodiments may be divided. For example, recommended responses corresponding to the food image may be subdivided depending on user information, a context of a user, and the like.

The processor 130 may store a user's response to the multimedia message for each of the types of contents to update the mapping information. For example, in the case in which a message different from a recommended response included in the recommended response list 1000 is created and transmitted, the processor 130 may store the corresponding message.

The processor 130 may determine a position of the storage 150 in which the corresponding message is to be stored in consideration of the types of contents divided while generating the recommended response list 100, or the like, and update the transmitted message. For example, in the case in which the processor 130 extracts the food image as the type of content and the detailed information and displays the recommended response list corresponding to the food image, the processor 130 may store a message separately created by a user as a recommended response corresponding to the food image.

Figure 10A:
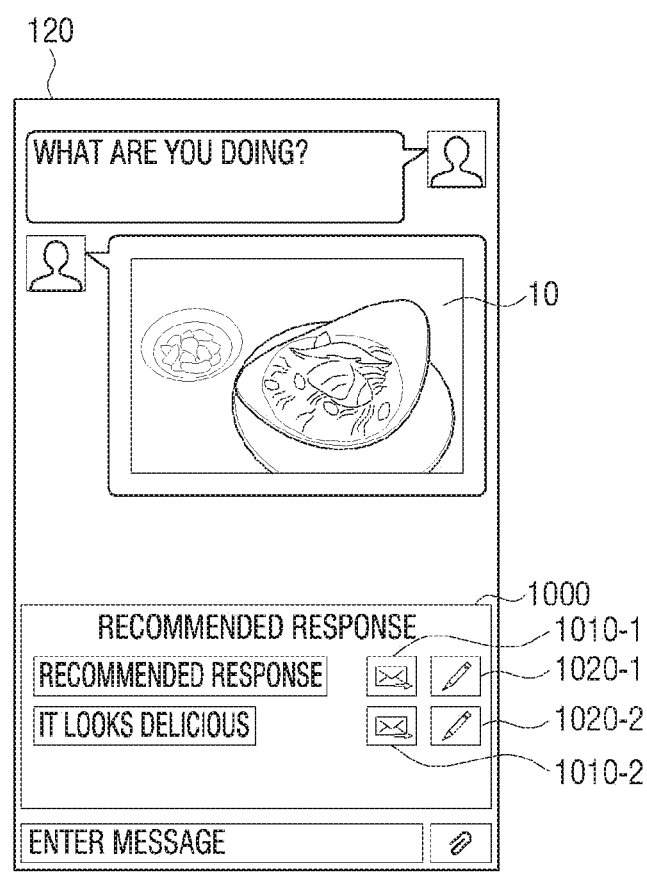
FIGS. 10A and 10B are views for describing an example of a method for displaying a graphic user interface (GUI) for transmitting or editing a recommended response.
Figure 10B:
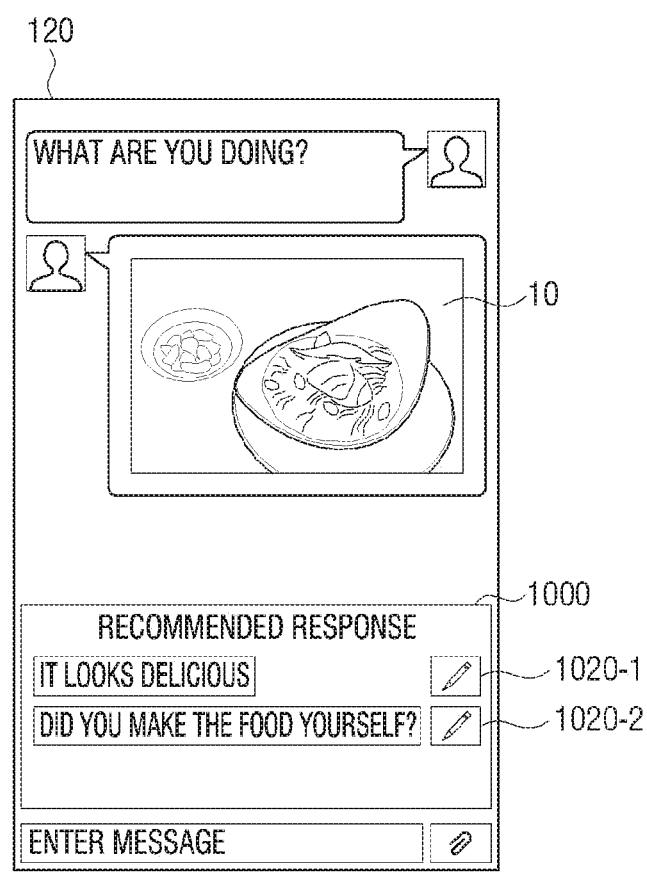

FIGS. 10A and 10B are views for describing an example of a method for displaying a GUI for transmitting or editing a recommended response. The processor 130 may display at least one of a first GUI for transmitting each of one or more responses included in the recommended response list 1000 and a second GUI for editing each of one or more responses.

FIG. 10A illustrates first GUIs 1010-1 and 1010-2 for transmitting a recommended response and second GUIs 1020-1 and 1020-2 for editing the recommended response. For example, in the case in which a user's input touching the first GIU 1010-1 exists, the processor 130 may transmit "It looks delicious." of a recommended response list 1000. Alternatively, in the case in which a user's input touching the second GIU 1020-1 exists, the processor 130 may display a UI capable of editing "It looks delicious." of the recommended response list 1000. In this case, the processor 130 may include and display "It looks delicious." in the UI.

FIG. 10B illustrates another exemplary embodiment for transmitting and editing a recommended response. For example, in the case in which a user's input touching "It looks delicious." of a recommended response list 1000 exists, the processor 130 may transmit "It looks delicious.". A method for editing the recommended response is the same as that of FIG. 10A, and a description therefor is thus omitted.

Although a case of touching the recommended response itself or touching a separate GUI is described in FIGS. 10A and 10B, the present disclosure is not limited thereto. For example, the processor 130 may transmit the recommended response in the case of short-touching the recommended response, and edit the recommended response in the case of long-touching the recommended response. Alternatively, the processor 130 may transmit the recommended response in the case of touching the recommended response, and edit the recommended response in the case of touching and dragging the recommended response to a message input window.

Although a case in which the user terminal device 100 analyzes the message and displays the corresponding recommended response list 1000 is described hereinabove, the present disclosure is not limited thereto. For example, the user terminal device 100 may transmit the message to a server device, and receive and display the recommended response list 1000 generated by the server device. This will be described with reference to FIG. 11.

Figure 11:
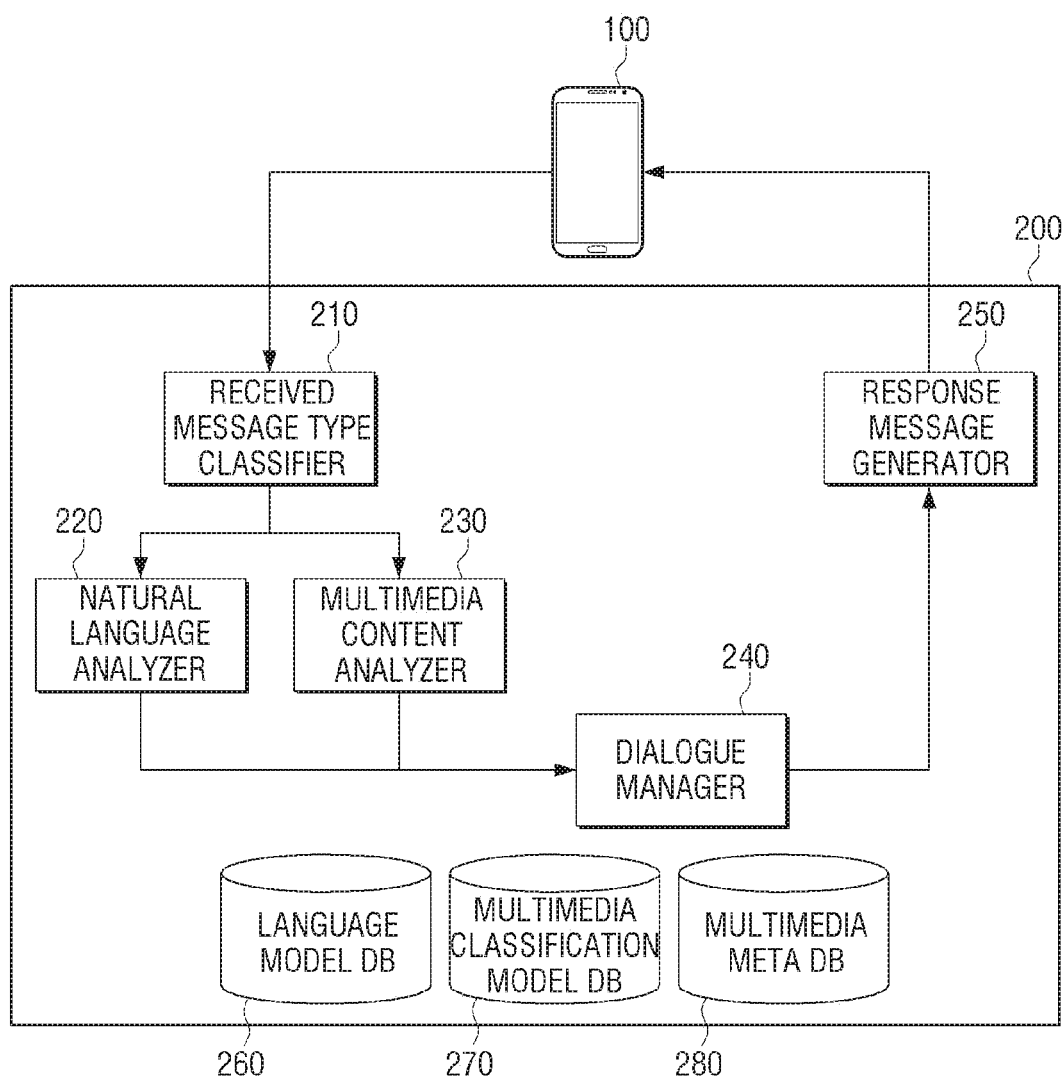
FIG. 11 is a view for describing a method for analyzing a message and providing a recommended response list by a server device according to another exemplary embodiment of the present disclosure.

FIG. 11 is a view for describing a method for analyzing a message and providing a recommended response list 1000 by a server device 200 according to another exemplary embodiment of the present disclosure.

The server device 200 includes a received message type classifier 210, a natural language analyzer 220, a multimedia content analyzer 230, a dialogue manager 240, a response message generator 250, a language model database (DB) 260, a multimedia classification model DB 270, and a multimedia meta DB 280.

The received message type classifier 210 may analyze a received message, and may transfer a text to the natural language analyzer 220 and transfer the remaining data except for the text to the multimedia content analyzer 230.

The natural language analyzer 220 is the same as a conventional text message analyzing module, and may analyze morpheme, syntax, meaning, and the like, using the language model DB 260. The natural language analyzer 220 may transfer an analyzed result to the dialogue manager 240.

The multimedia content analyzer 230 may extract a type of content, detailed information of the type of content, and the like, using the multimedia classification model DB 270, and extract and analyze additional information of the content using the multimedia meta DB 280. The multimedia content analyzer 230 may transfer an extracted and analyzed result to the dialogue manager 240.

The dialogue manager 240 may decide a current dialogue state on the basis of data transferred from the natural language analyzer 220 or the multimedia content analyzer 230. The dialogue manager 240 may deduce a predicted response type on the basis of the current dialogue state. The dialogued manager 240 may transfer the dialogue state and the response type to the response message generator 250. The dialogue state may include both of a context in a dialogue session and an analyzed result of a received multimedia content.

The response message generator 250 may generate a recommended response corresponding to the current dialogue state and the response type using the langue model DB 260. The response message generator 250 may transmit the generated recommended response to the user terminal device 100.

Although a case in which the server device 200 analyzes the content and generates the recommended response is illustrated in FIG. 11, the present disclosure is not limited thereto. For example, the server device 200 may be divided into an analyzing server analyzing the content and a response generating server generating the recommended response.

Figure 12:
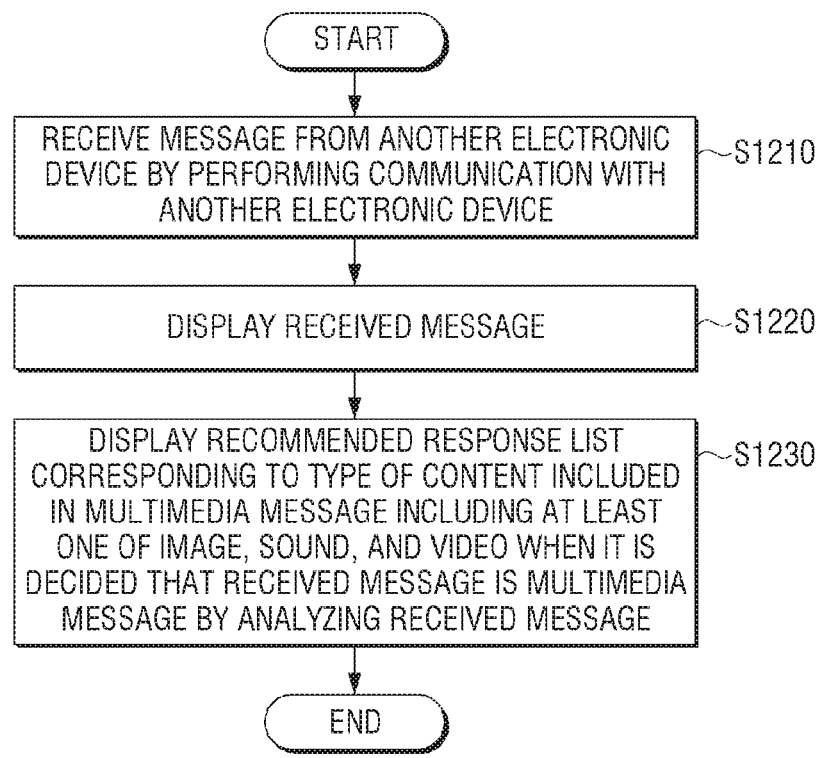
FIG. 12 is a flow chart for describing a method for recommending a response message of a user terminal device according to an exemplary embodiment of the present disclosure.

FIG. 12 is a flow chart for describing a method for recommending a response message of a user terminal device according to an exemplary embodiment of the present disclosure.

First, the user terminal device receives a message by performing communication with another electronic device (S1210). Then, the user terminal device displays the received message (S1220). Then, the user terminal device displays a recommended response list corresponding to a type of content included in a multimedia message including at least one of an image, a sound, and a video when it is decided that the received message is the multimedia message by analyzing the received message (S1230).

In addition, the displaying (S1230) of the recommended response list may include: extracting detailed information of the type of content by analyzing the multimedia message and displaying a recommended response list corresponding to the extracted detailed information.

In addition, in the displaying (S1230) of the recommended response list, the recommended response list corresponding to the multimedia message may be displayed on the basis of a content of a message transmitted or received to or from a user of another electronic device before the multimedia message is received.

In addition, in the displaying (S1230) of the recommended response list, the recommended response list corresponding to the multimedia message may be displayed on the basis of at least one of the type of content and a context of a user at a point in time in which the multimedia message is received.

In addition, the method for recommending a response message may further include determining the context of the user on the basis of at least one of a function activated in the user terminal device, a sensed result by at least one sensor included in the user terminal device, a schedule registered in the user terminal device, and a use behavior pattern of the user terminal device.

In addition, in the displaying (S1230) of the recommended response list, the recommended response list corresponding to the type of multimedia message may be displayed on the basis of at least one of an age and a gender of a user of the user terminal device.

In addition, in the displaying (S1230) of the recommended response list, in the case in which a first type of content and a second type of content different from the first type of content are included in the multimedia message, the recommended response list corresponding to at least one of the first type of content and the second type of content may be displayed.

In addition, in the displaying (S1230) of the recommended response list, the recommended response list corresponding to the type of content included in the multimedia message may be displayed on the basis of mapping information on mapping between the type of content and the recommended response list corresponding to the type of content, when the multimedia message is received.

In addition, the method for recommending a response message may further include storing a user's response to the multimedia message for each of types of contents to update the mapping information.

In addition, in the displaying (S1230) of the recommended response list, at least one of a first GUI for transmitting each of one or more responses included in the recommended response list and a second GUI for editing each of one or more responses may be displayed.

Figure 13:
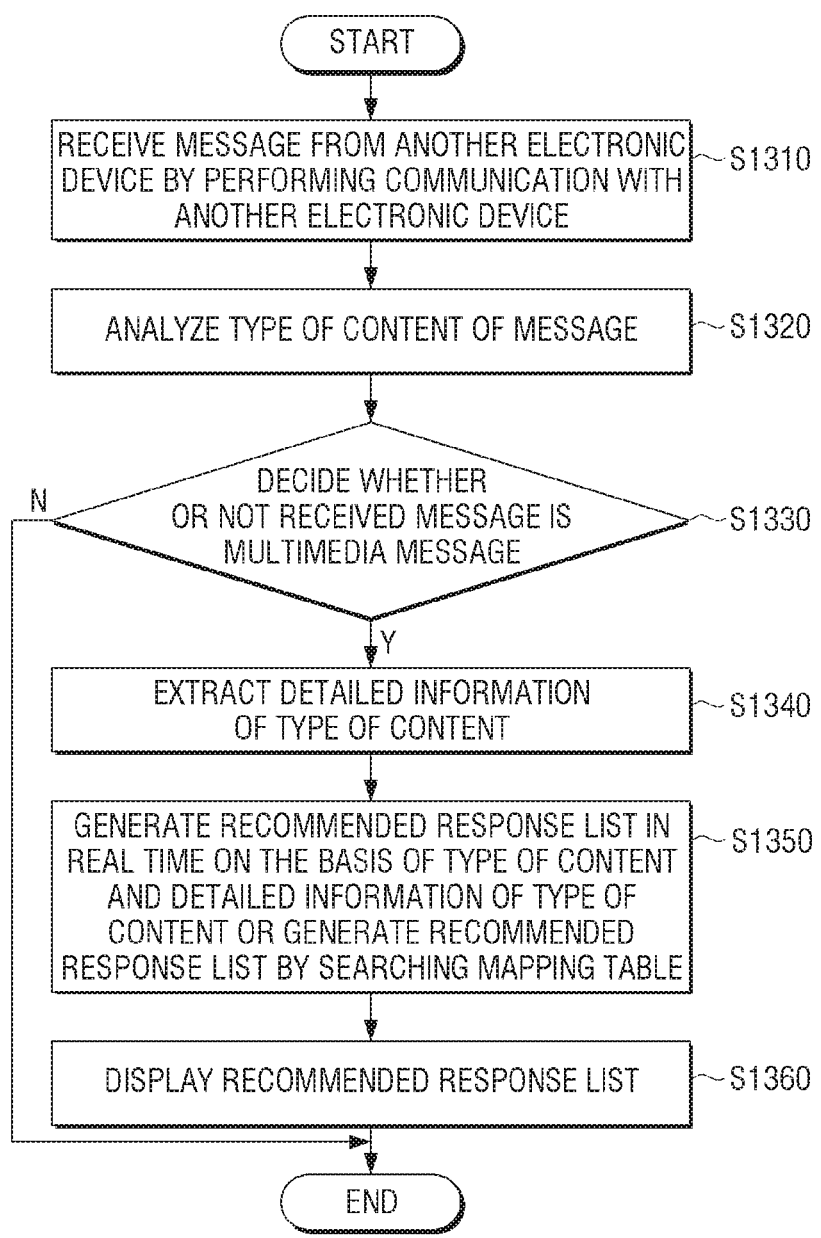
FIG. 13 is a flow chart for describing the method for recommending a response message of a user terminal device according to an exemplary embodiment of the present disclosure in detail.

FIG. 13 is a flow chart for describing the method for recommending a response message of a user terminal device according to an exemplary embodiment of the present disclosure in detail.

First, the user terminal device receives a message by performing communication with another electronic device (S1310). Then, the user terminal device analyzes a type of content of the message (S1320). The user terminal device decides whether or not the received message is a multimedia message by analyzing the type of content (S1330). The multimedia message may be a message including at least one of an image, a sound, and a video. Alternatively, the multimedia message may be one of an image, a sound, and a video.

The user terminal device may not perform any operation when it is decided that the received message is not the multimedia message. For example, the user terminal device may not perform any operation in the case in which the received message is a text message. However, the user terminal device may provide a recommended response list for the text message, which is a general technology, and a description therefor is thus omitted.

The user terminal device extracts detailed information of the type of content when it is decided that the received message is the multimedia message (S1340). For example, when the received message is a message including an image, the user terminal device may determine a landscape image, a person image, a food image, and the like, as the detailed information of the type of content.

Then, the user terminal device may generate a recommended response list in real time on the basis of the type of content and the detailed information of the type of content or generate a recommended response list by searching a mapping table (S1350). Particularly, the user terminal device may generate the recommended response list on the basis of at least one of the previous dialogue content or usage with a user of another electronic device, a current context of the user, a result to be sensed by a sensor provided in the user terminal device, a use behavior pattern analyzed in the user terminal device, and user information such as an age, a gender, and the like, of the user.

Then, the user terminal device displays the recommended response list (S1360).

According to the diverse exemplary embodiments of the present disclosure as described above, the user terminal device provides the recommended response list corresponding to the type of content included in the multimedia message, such that the user may easily transmit the response message even in the case of receiving the multimedia message.

Meanwhile, the methods for recommending a response message of a user terminal device according to the diverse exemplary embodiments of the present disclosure described above may be implemented by a program code that may be executed in a computer and be provided in the respective servers or apparatuses to be executed by a processor in a state in which they are stored in various non-transitory computer-readable media.

As an example, a non-transitory computer-readable medium in which a program for sequentially performing receiving a message from another electronic device by performing communication with another electronic device, displaying the received message, and displaying a recommended response list corresponding to a type of content included in a multimedia message including at least one of an image, a sound, and a video when it is decided that the received message is the multimedia message by analyzing the received message is stored may be provided.

The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although exemplary embodiments of the present disclosure have been illustrated and described hereinabove, the present disclosure is not limited to the abovementioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A user terminal device comprising:
a communicator;
a display; and
a processor configured to:
receive a multimedia message from another electronic device through the communicator,
control the display to display the received multimedia message, and
based on the received multimedia message being determined, by analyzing the received multimedia message, to convey one of a non-textual image or a video, control the display to display a recommended response list of recommended reply messages for transmission to the other electronic device in response to the received multimedia message, the recommended response list of recommended reply messages corresponding to a type of content included in the received multimedia message,
wherein the recommended response list of recommended reply messages corresponding to the type of content included in the received multimedia message is based on at least one of an age or a gender of a user of the user terminal device.

2. The user terminal device as claimed in claim 1, wherein the recommended response list of recommended reply messages corresponding to the type of content included in the received multimedia message is additionally based on at least one of the type of content and a context of a user of the user terminal device at a point in time in which the multimedia message is received.

3. The user terminal device as claimed in claim 2, wherein the processor is further configured to determine the context of the user based on at least one of a function activated in the user terminal device, a sensed result by at least one sensor included in the user terminal device, a schedule registered in the user terminal device, or a use behavior pattern in the user terminal device.

4. The user terminal device as claimed in claim 1, further comprising:
a storage configured to store mapping information on mapping between the type of content and the recommended response list of recommended reply messages corresponding to the type of content,
wherein the recommended response list of recommended reply messages corresponding to the type of content included in the received multimedia message is additionally based on the mapping information stored in the storage when the multimedia message is received.

5. The user terminal device as claimed in claim 4, wherein the processor is further configured to store a user's response to the received multimedia message for each type of content to update the mapping information.

6. The user terminal device as claimed in claim 1, wherein the processor is further configured to extract detailed information of the type of content as a part of the analyzing of the received multimedia message, and wherein the recommended response list of recommended reply messages corresponding to the type of content included in the received multimedia message is additionally based on the extracted detailed information.

7. The user terminal device as claimed in claim 1, wherein the recommended response list of recommended reply messages corresponding to the type of content included in the received multimedia message is additionally based on a content of a message transmitted or received to or from a user of the other electronic device before the multimedia message is received.

8. The user terminal device as claimed in claim 1, wherein in a case in which a first type of content and a second type of content different from the first type of content are included in the received multimedia message, the recommended response list of recommended reply messages corresponding to the type of content included in the received multimedia message is additionally based on at least one of the first type of content or the second type of content.

9. The user terminal device as claimed in claim 1, wherein the processor is further configured to display at least one of a first graphic user interface (GUI) for transmitting each of one or more recommended reply messages included in the recommended response list or a second GUI for editing each of one or more recommended reply messages.

10. A method for recommending a response message of a user terminal device, the method comprising:
- receiving a multimedia message from another electronic device;
- displaying the received multimedia message; and
- based on the received multimedia message being determined, by analyzing the received multimedia message, to convey one of non-textual image or a video, displaying a recommended response list of recommended reply messages for transmission to the other electronic device in response to the received multimedia message, the recommended response list of recommended reply messages corresponding to a type of content included in the received multimedia message,
- wherein the recommended response list of recommended reply messages corresponding to the type of content included in the received multimedia message is based on at least one of an age or a gender of a user of the user terminal device.

11. The method as claimed in claim 10, wherein the recommended response list of recommended reply messages corresponding to the type of content included in the received multimedia message is additionally based on at least one of the type of content and a context of a user of the user terminal device at a point in time in which the multimedia message is received.

12. The method as claimed in claim 11, further comprising:
- determining the context of the user based on at least one of a function activated in the user terminal device, a sensed result by at least one sensor included in the user terminal device, a schedule registered in the user terminal device, or a use behavior pattern in the user terminal device.

13. The method as claimed in claim 10, wherein the recommended response list of recommended reply messages corresponding to the type of content included in the received multimedia message is additionally based on mapping information stored in a storage when the received multimedia message is received, the mapping information including a mapping between the type of content and the recommended response list of recommended reply messages corresponding to the type of content.

14. The method as claimed in claim 13, further comprising:
- storing a user's response to the received multimedia message for each type of content to update the mapping information.

15. The method as claimed in claim 10, further comprising:
- extracting detailed information of the type of content as a part of the analyzing of the received multimedia message,
- wherein the recommended response list of recommended reply messages corresponding to the type of content included in the received multimedia message is additionally based on the extracted detailed information.

16. The method as claimed in claim 10, wherein the recommended response list of recommended reply messages corresponding to the type of content included in the received multimedia message is additionally based on a content of a message transmitted or received to or from a user of the other electronic device before the multimedia message is received.

17. The method as claimed in claim 10, wherein in a case in which a first type of content and a second type of content different from the first type of content are included in the received multimedia message, the recommended response list of recommended reply messages corresponding to the type of content included in the received multimedia message is additionally based on at least one of the first type of content or the second type of content.

18. The method as claimed in claim 11, further comprising:
- displaying at least one of a first graphic user interface (GUI) for transmitting each of one or more recommended reply messages included in the recommended response list or a second GUI for editing each of the one or more recommended reply messages.

* * * * *